United States Patent
Huang et al.

(10) Patent No.: US 11,302,990 B2
(45) Date of Patent: Apr. 12, 2022

(54) BATTERY MODULE

(71) Applicant: CONTEMPORARY AMPEREX TECHNOLOGY CO., LIMITED, Ningde (CN)

(72) Inventors: Xiaoteng Huang, Ningde (CN); Mingshu Chen, Ningde (CN); Xingyuan Wu, Ningde (CN); Jiarong Hong, Ningde (CN)

(73) Assignee: CONTEMPORARY AMPEREX TECHNOLOGY CO., LIMITED, Fujian Province (CN)

( * ) Notice: Subject to any disclaimer, the term of this patent is extended or adjusted under 35 U.S.C. 154(b) by 219 days.

(21) Appl. No.: 16/673,472

(22) Filed: Nov. 4, 2019

(65) Prior Publication Data

US 2020/0203689 A1 Jun. 25, 2020

(30) Foreign Application Priority Data

Dec. 21, 2018 (CN) .......................... 201811574829.7

(51) Int. Cl.
*H01M 50/375* (2021.01)
*H01M 10/42* (2006.01)
*H01M 50/20* (2021.01)

(52) U.S. Cl.
CPC ..... *H01M 50/375* (2021.01); *H01M 10/4257* (2013.01); *H01M 50/20* (2021.01)

(58) Field of Classification Search
CPC . H01M 50/375; H01M 50/20; H01M 10/4257
See application file for complete search history.

(56) References Cited

U.S. PATENT DOCUMENTS

| | | | | |
|---|---|---|---|---|
| 2015/0023392 | A1* | 1/2015 | Noh ..................... | G01K 13/00 374/185 |
| 2015/0070021 | A1* | 3/2015 | Dulle .................... | B60L 3/0046 324/426 |
| 2015/0263396 | A1 | 9/2015 | Kitamura | |

FOREIGN PATENT DOCUMENTS

| CN | 104704674 A | 6/2015 |
|---|---|---|
| CN | 20711663 4 U | 3/2018 |

(Continued)

OTHER PUBLICATIONS

Contemporary Amperex Technology Co., Limited, First Office Action, CN201811574829.7, dated Sep. 2, 2020, 9 pgs.

(Continued)

*Primary Examiner* — Olatunji A Godo
(74) *Attorney, Agent, or Firm* — Morgan, Lewis & Bockius LLP

(57) ABSTRACT

The present disclosure provides a battery module, a manufacturing method of the battery module and a vehicle, the battery module comprises batteries and a thermistor. Each battery comprises a cap plate, a positive electrode terminal, a negative electrode terminal and a vent, the vent is positioned between the positive electrode terminal and the negative electrode terminal. The cap plate comprises a first boundary away from the positive electrode terminal, and the vent comprises a third boundary close to the positive electrode terminal. The thermistor is positioned between the first boundary and the third boundary. Because the positive electrode terminal and the location around the positive electrode terminal are high in temperature, therefore when the thermistor collects the temperature of the battery, it greatly reduces the deviation between the collected temperature obtained by the thermistor and the actual temperature of the battery, thereby improving the accuracy of temperature sampling.

20 Claims, 4 Drawing Sheets

(56) References Cited

FOREIGN PATENT DOCUMENTS

| | | |
|---|---|---|
| CN | 107946489 A | 4/2018 |
| CN | 204243156 U | 4/2018 |
| CN | 207183388 U | 4/2018 |
| CN | 207233789 U | 4/2018 |
| CN | 207398245 U | 5/2018 |
| CN | 108155335 A | 6/2018 |
| CN | 105895835 B | 7/2018 |
| CN | 208256795 U | 12/2018 |
| EP | 0773596 A1 | 5/1997 |
| EP | 2453513 A1 | 5/2012 |
| EP | 3316384 A1 | 5/2018 |
| JP | 2014212098 A | 11/2014 |
| JP | 2018101488 A | 6/2018 |

OTHER PUBLICATIONS

Contemporary Amperex Technology Co., Limited, International Search Report, PCT/CN2019/124364, dated Mar. 9, 2020, 9 pgs.
Contemporary Amperex Technology Co., Limited, Extended European Search Report EP19207860.8, dated Apr. 22, 2020, 7 pgs.
Contemporary Amperex Technology Co., Limited, First Office Action, JP2019-157849, dated Aug. 28, 2020, 6 pgs.

* cited by examiner

BATTERY MODULE

CROSS-REFERENCE TO RELATED APPLICATIONS

The present application claims priority to Chinese patent application No. CN201811574829.7, filed on Dec. 21, 2018, which is incorporated herein by reference in its entirety.

FIELD OF THE PRESENT DISCLOSURE

The present disclosure relates to the field of battery technology, and particularly relates to a battery module, a manufacturing method of the battery module and a vehicle.

BACKGROUND OF THE PRESENT DISCLOSURE

When a battery module is used in a battery pack of a new energy vehicle, it usually needs to collect the temperature of the battery in the battery module. At present, the mode of commonly collecting the temperature of the battery is to arrange a thermistor (such as NTC) on the connecting sheet (positioned above the battery and connected to the electrode terminals of two adjacent batteries). When the battery module is in a high current working condition, because the current flowing through the connecting sheet is larger, the collecting mode may cause the collected temperature to greatly deviate from the actual temperature of the battery, thereby causing the battery system of the battery pack to limit the power earlier or to send a false alarm, etc.

SUMMARY OF THE PRESENT DISCLOSURE

In view of the problem existing in the background, an object of the present disclosure is to provide a battery module, a manufacturing method of the battery module and a vehicle, which greatly reduces the deviation between the collected temperature obtained by the thermistor and the actual temperature of the battery, and improves the accuracy of temperature sampling.

In order to achieve the above object, in a first aspect, the present disclosure provides a battery module, which comprises a plurality of batteries arranged side by side in a longitudinal direction and a thermistor used for collecting the temperature of each of the batteries. Each of the batteries comprises a cap plate, a positive electrode terminal, a negative electrode terminal and a vent, the positive electrode terminal and the negative electrode terminal are spaced apart from each other and provided on the cap plate, and the vent is provided on the cap plate and positioned between the positive electrode terminal and the negative electrode terminal. The cap plate comprises a first boundary away from the positive electrode terminal in a transversal direction, and the vent comprises a third boundary close to the positive electrode terminal in the transversal direction. The thermistor is provided on the cap plate and positioned between the first boundary of the cap plate and the third boundary of the vent.

The negative electrode terminal comprises a fifth boundary away from the vent in the transversal direction. The thermistor is positioned between the fifth boundary of the negative electrode terminal and the third boundary of the vent.

The negative electrode terminal further comprises a sixth boundary close to the vent in the transversal direction. The thermistor is positioned between the sixth boundary of the negative electrode terminal and the third boundary of the vent.

The thermistor is positioned between the fifth boundary and the sixth boundary of the negative electrode terminal.

The vent further comprises a fourth boundary away from the positive electrode terminal. The thermistor is positioned between the fourth boundary and the third boundary of the vent.

The battery module further comprises a circuit board provided above the cap plates of the plurality of batteries and positioned between the positive electrode terminal and the negative electrode terminal. The thermistor is connected to the circuit board.

The battery module further comprises a conductive wire, one end of the conductive wire is connected to the circuit board, and the other end of the conductive wire is connected to the thermistor.

Each of the batteries further comprises: an electrode assembly comprising a main body portion, a positive electrode tab protruding from the main body portion and a negative electrode tab protruding from the main body portion; a case sealing the electrode assembly with the cap plate; a first adapter sheet connecting the positive electrode tab of the electrode assembly and the positive electrode terminal; and the second adapter sheet connecting the negative electrode tab of the electrode assembly and the negative electrode terminal. Moreover, the first adapter sheet is formed with a weak area. In addition, a thermal pad or a thermal adhesive is provided between the cap plate and the thermistor.

In a second aspect, the present disclosure further provides a manufacturing method of a battery module, which comprises steps of: providing a plurality of batteries, and each of the batteries comprising a cap plate, a positive electrode terminal, a negative electrode terminal and a vent, the positive electrode terminal and the negative electrode terminal being spaced apart from each other and provided on the cap plate, and the vent being provided on the cap plate and positioned between the positive electrode terminal and the negative electrode terminal, and the cap plate comprising a first boundary away from the positive electrode terminal in a transversal direction, and the vent comprising a third boundary close to the positive electrode terminal in the transversal direction; making the plurality of batteries arranged side by side in a longitudinal direction; providing a thermistor and making the thermistor positioned between the first boundary of the cap plate and the third boundary of the vent; and making the thermistor fixed on the cap plate.

In a third aspect, the present disclosure further provides a vehicle, which comprises a battery pack, and the battery pack comprises a battery module described above.

The present disclosure has the following beneficial effects: because the melting point of the material of the positive electrode terminal is lower than the melting point of the material of the negative electrode terminal (that is, the temperature of the positive electrode terminal rises faster than that of the negative electrode terminal at the same current, and the heat generated by the positive electrode terminal is larger than that of the negative electrode terminal), and the first adapter sheet electrically connected to the positive electrode terminal is formed with the weak area (because the smaller the cross section through which the current flows is, the larger the resistance of the cross section is, and the more the heat generated by the cross section is), the heat generated by the weak area can also be conducted to the positive electrode terminal and the location around the positive electrode terminal, thereby causing the positive electrode terminal and the location around the positive electrode terminal to be high in temperature. Therefore, when the thermistor is provided on the cap plate and is positioned between the first boundary of the cap plate and the third boundary of the vent to collect the temperature of the battery, it greatly reduces the deviation between the collected temperature obtained by the thermistor and the actual temperature of the battery, thereby improving the accuracy of temperature sampling.

Figure 1:
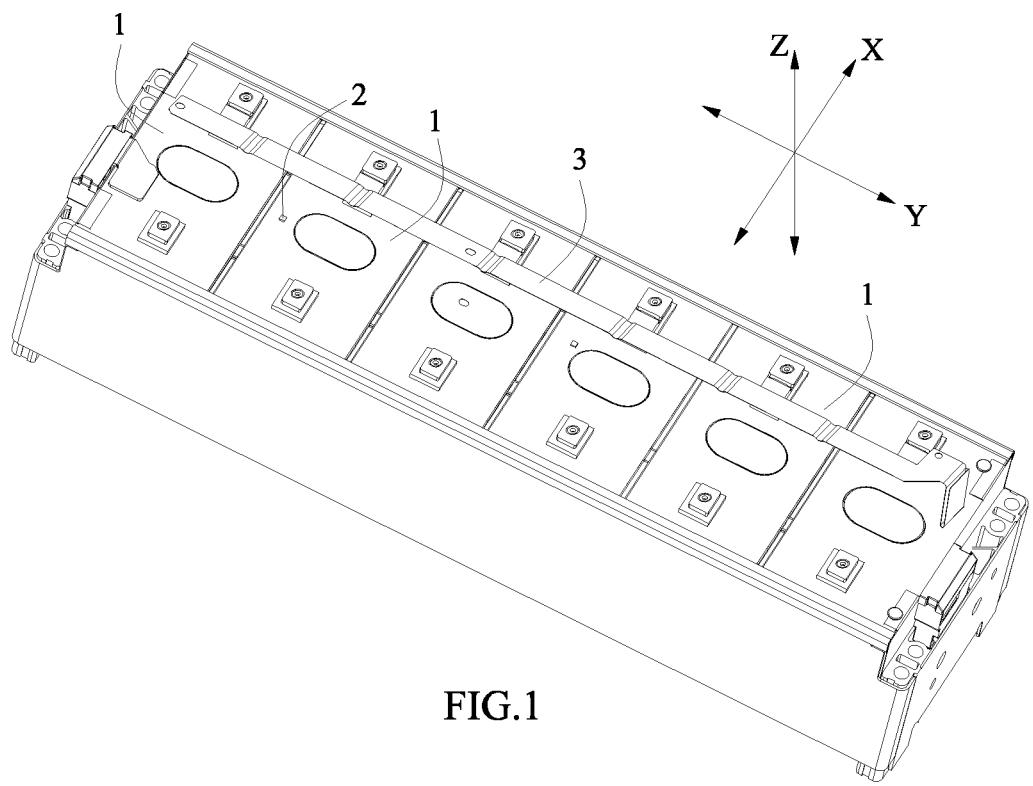
FIG. 1 is a perspective view of a battery module of an embodiment of the present disclosure.

Reference numerals in figures are represented as follows:
1 battery
  11 cap plate
    111 first boundary
    112 second boundary
  12 positive electrode terminal
  13 negative electrode terminal
    131 fifth boundary
    132 sixth boundary
  14 vent
    141 third boundary
    142 fourth boundary
  15 electrode assembly
    151 main body portion
    152 positive electrode tab
    153 negative electrode tab
  16 case
  17 first adapter sheet
    171 weak area
  18 second adapter sheet
2 thermistor
3 circuit board
4 conductive wire
X transversal direction
Y longitudinal direction
Z up-down direction

DETAILED DESCRIPTION

To make the object, technical solutions, and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second", "third", "fourth", "fifth" and "sixth" are only used for illustrative purposes and are not to be construed as expressing or implying a relative importance. The term "plurality" is two or more. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure.

Figure 2:
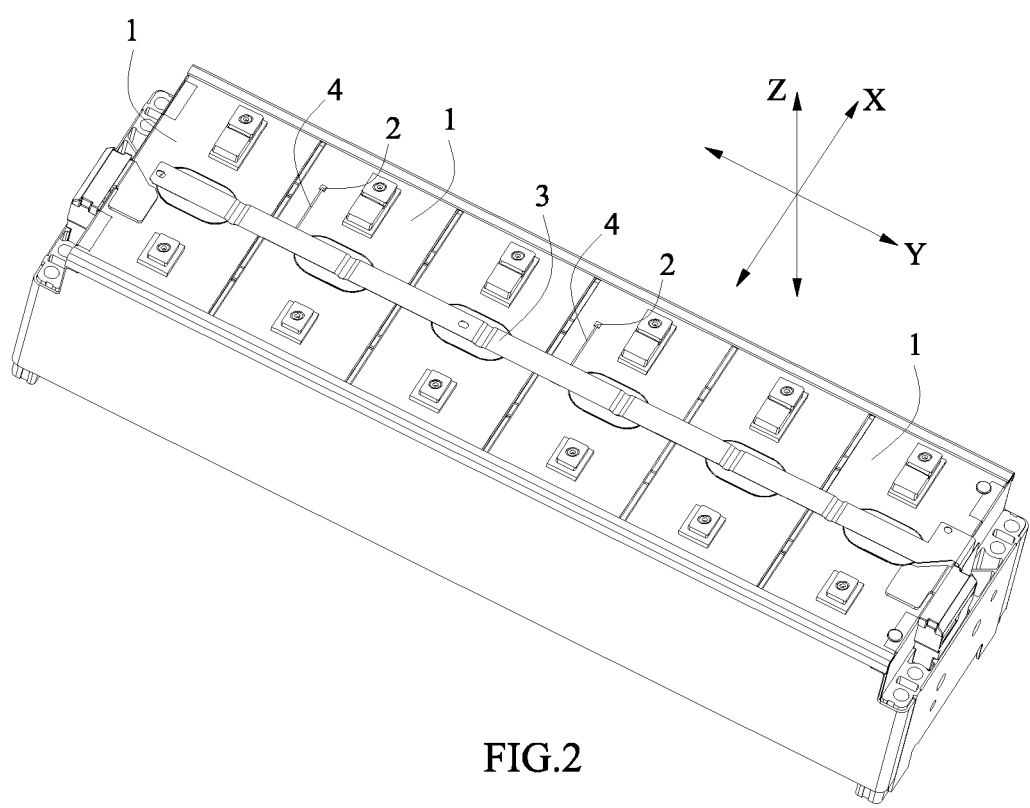
FIG. 2 is a perspective view of the battery module of another embodiment of the present disclosure.

Referring to FIG. 1 and FIG. 2, a vehicle of the present disclosure comprises a battery pack, the battery pack comprises a battery module, and the battery module comprises a plurality of batteries 1, a thermistor 2, a circuit board 3 and a conductive wire 4.

Figure 3:
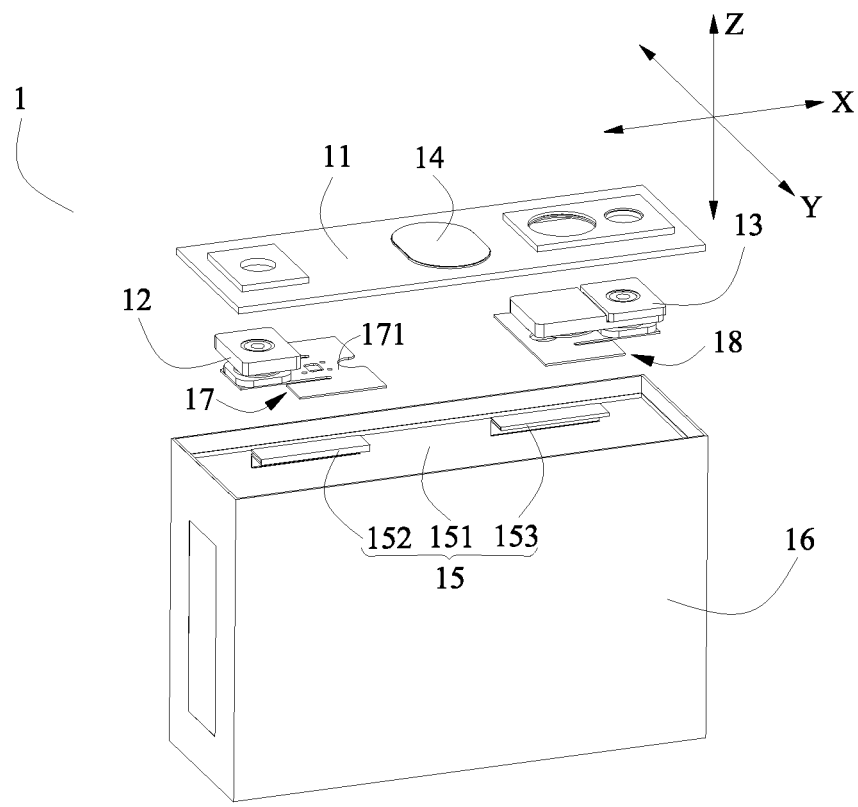
FIG. 3 is an exploded view of a battery of the battery module.

Referring to FIG. 3, the plurality of batteries 1 are arranged side by side in a longitudinal direction Y, each of the batteries 1 comprises a cap plate 11, a positive electrode terminal 12, a negative electrode terminal 13, a vent 14, an electrode assembly 15, a case 16, a first adapter sheet 17, a second adapter sheet 18 and an electrolyte sealed in the case 16.

Figure 4:
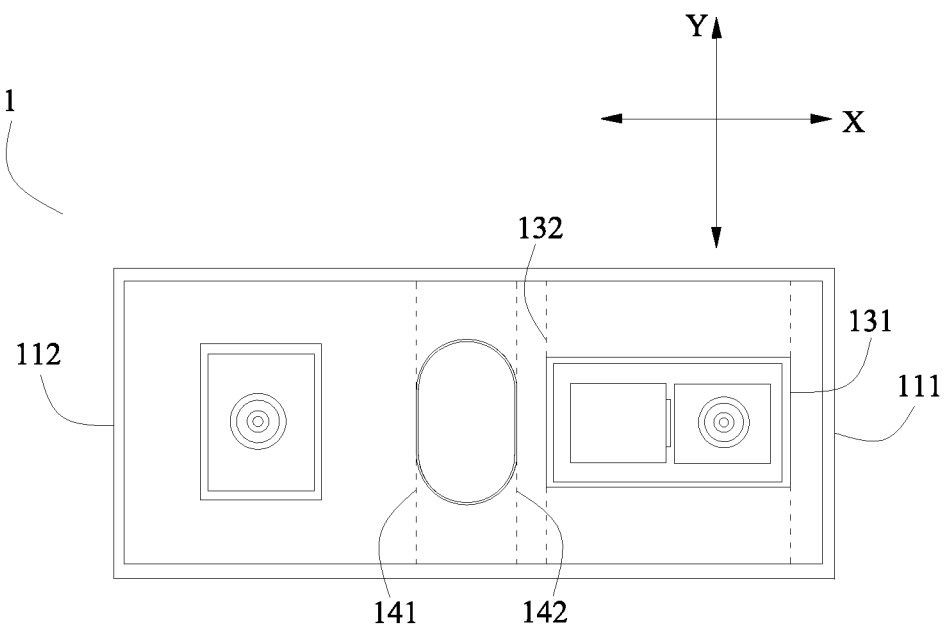
FIG. 4 is a top view of the battery of the battery module.
Figure 5:
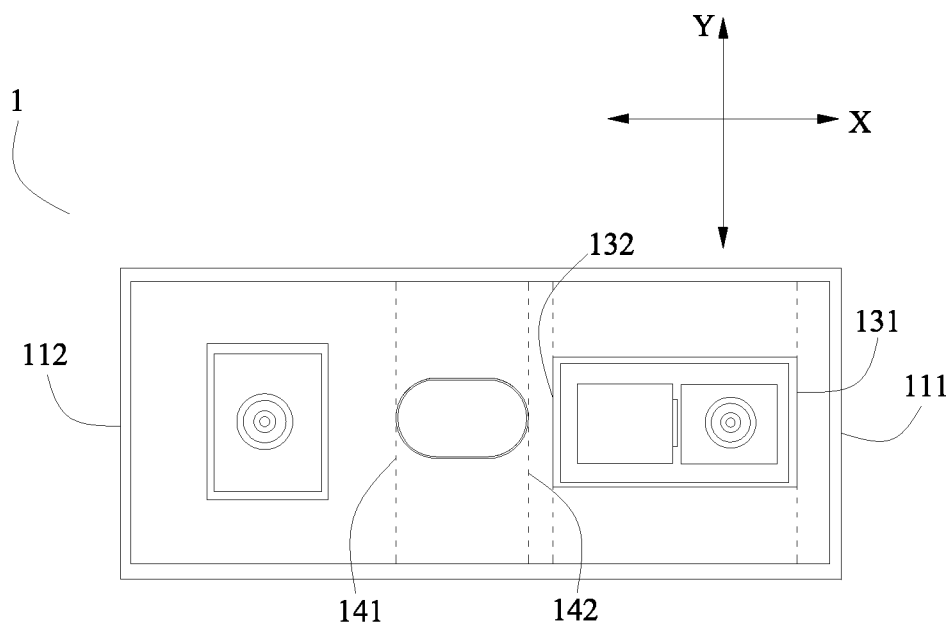
FIG. 5 is a variation view of the FIG. 4.
Figure 6:
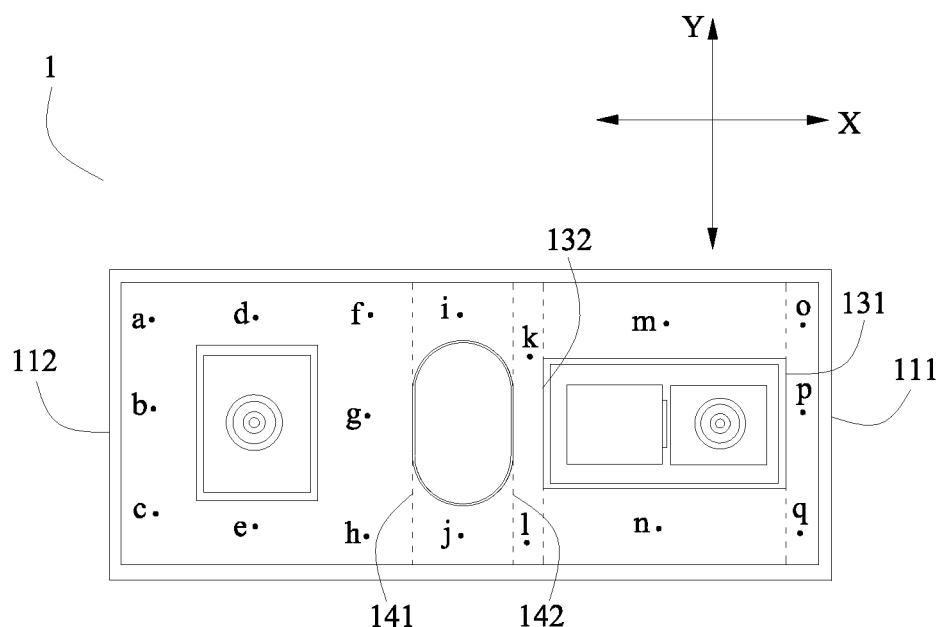
FIG. 6 is a schematic view showing the position distribution of sampling points during the simulation experiment, in which the letters a~q indicate the sampling points number.

Referring to FIG. 4 to FIG. 6, the cap plate 11 comprises a first boundary 111 away from the positive electrode terminal 12 and a second boundary 112 close to the positive electrode terminal 12 in a transversal direction X. The cap plate 11 may be made of a metal material.

The positive electrode terminal 12 and the negative electrode terminal 13 are spaced apart from each other and provided on the cap plate 11. In each of the batteries 1, because the potential of the positive electrode is higher than the potential of the negative electrode, in order to prevent the electrolyte from electrochemically corroding the negative electrode terminal 13, the negative electrode terminal 13 needs to use a material having a higher melting point than that of the positive electrode terminal 12. Specifically, the material of the positive electrode terminal 12 may be aluminum, the material of the negative electrode terminal 13 may be copper. Referring to FIG. 4 to FIG. 6, the negative electrode terminal 13 comprises a fifth boundary 131 away from the vent 14 and a sixth boundary 132 close to the vent 14 in the transversal direction X.

The vent 14 is provided on the cap plate 11 and is positioned between the positive electrode terminal 12 and the negative electrode terminal 13. Referring to FIG. 4 to FIG. 6, the vent 14 comprises a third boundary 141 close to the positive electrode terminal 12 and a fourth boundary 142 away from the positive electrode terminal 12 in the transversal direction X.

Referring to FIG. 3, the electrode assembly 15 comprises a main body portion 151, a positive electrode tab 152 protruding from the main body portion 151 and a negative electrode tab 153 protruding from the main body portion 151. The main body portion 151 comprises a positive electrode plate, a negative electrode plate and a separator, the separator is provided between the positive electrode plate and the negative electrode plate. The positive electrode plate, the separator and the negative electrode plate can be sequentially stacked and wound into a jelly roll shape to form the main body portion 151 of the electrode assembly 15

(i.e., the wound electrode assembly). Of course, the positive electrode plate, the separator and the negative electrode plate can also be sequentially laminated in a multilayer structure to form the main body portion 151 of the electrode assembly 15 (i.e., the laminated electrode assembly).

The positive electrode plate comprises a positive electrode current collector (such as an aluminum foil) and a positive active material (such as lithium cobalt oxide) coated on a surface of the positive electrode current collector, the negative electrode plate comprises a negative electrode current collector (such as a copper foil) and a negative active material (such as silicon) coated on a surface of the negative electrode current collector. An edge of the positive electrode current collector may have a blank area which is not coated by the positive active material, and the positive electrode tab 152 may be formed by directly cutting the blank area of the positive electrode current collector; correspondingly, the negative electrode tab 153 may be formed by directly cutting the blank area of the negative electrode current collector. In other words, the material of the positive electrode tab 152 may be an aluminum foil, and the material of the negative electrode tab 153 may be a copper foil.

Referring to FIG. 3, an accommodating cavity is formed inside the case 16 to accommodate the electrode assembly 15 and the electrolyte. An opening is formed at one end of the case 16, and the electrode assembly 15 can be placed into the accommodating cavity of the case 16 via the opening. The cap plate 11 covers the opening of the case 16 and is fixedly connected (such as welded) to the case 16 to seal the electrode assembly 15 and the electrolyte in the case 16. The case 2 may be made of a conductive metal material such as aluminum or aluminum alloy, or may be made of an insulating material such as plastic.

Referring to FIG. 3, the first adapter sheet 17 and the second adapter sheet 18 are used to realize the connection among the electrode assembly 15, the positive electrode terminal 12 and the negative electrode terminal 13. The first adapter sheet 17 connects the positive electrode tab 152 of the electrode assembly 15 and the positive electrode terminal 12, the second adapter sheet 18 connects the negative electrode tab 153 of the electrode assembly 15 and the negative electrode terminal 13. In order to protect the circuit from overload, the first adapter sheet 17 is formed with a weak area 171 (i.e., a fuse-like structure), when the current in the circuit is too high, the weak area 171 can be firstly melted to interrupt the circuit.

The circuit board 3 is provided above the cap plates 11 of the plurality of batteries 1, and a portion of the cap plate 11 positioned between the positive electrode terminal 12 and the negative electrode terminal 13 is not provided with other electrical connection components, so the circuit board 3 is positioned between the positive electrode terminal 12 and the negative electrode terminal 13. Specifically, the circuit board 3 may be a flexible printed circuit (abbreviated as FPC).

The thermistor 2 is provided on the cap plate 11 of the battery 1 and is connected to the circuit board 3 to collect the temperature of the battery 1. The thermistor 2 can be directly positioned on the cap plate 11, or a thermal pad or a thermal adhesive can be additionally provided between the cap plate 11 and the thermistor 2.

Because the melting point of the material of the positive electrode terminal 12 is lower than the melting point of the material of the negative electrode terminal 13 (that is, the temperature of the positive electrode terminal 12 rises faster than that of the negative electrode terminal 13 at the same current, and the heat generated by the positive electrode terminal 12 is larger than that of the negative electrode terminal 13), and the first adapter sheet 17 electrically connected to the positive electrode terminal 12 is formed with the weak area 171 (because the smaller the cross section through which the current flows is, the larger the resistance of the cross section is, and the more the heat generated by the cross section is), the heat generated by the weak area 171 can also be conducted to the positive electrode terminal 12 and the location around the positive electrode terminal 12, thereby causing the positive electrode terminal 12 and the location around the positive electrode terminal 12 to be high in temperature. Therefore, when the thermistor 2 is provided on the cap plate 11 and is positioned between the first boundary 111 of the cap plate 11 and the third boundary 141 of the vent 14 to collect the temperature of the battery 1, it greatly reduces the deviation between the collected temperature obtained by the thermistor 2 and the actual temperature (i.e., the internal temperature of the battery 1) of the battery 1, thereby improving the accuracy of temperature sampling.

Because the portion between the first boundary 111 of the cap plate 11 and the fifth boundary 131 of the negative electrode terminal 13 is close to the outside of the battery 1, and the portion is greatly affected by the external environment, so the temperature of the portion may deviate from the actual temperature of the battery 1 in some cases. Therefore, preferably the thermistor 2 is positioned between the fifth boundary 131 of the negative electrode terminal 13 and the third boundary 141 of the vent 14.

In an embodiment, referring to FIG. 1, the thermistor 2 is positioned between the sixth boundary 132 of the negative electrode terminal 13 and the third boundary 141 of the vent 14, the circuit board 3 is laid over the thermistor 2 (i.e., the thermistor 2 is positioned between the circuit board 3 and the cap plate 11).

In another embodiment, referring to FIG. 2, the thermistor 2 is positioned between the fifth boundary 131 and the sixth boundary 132 of the negative electrode terminal 13, so the thermistor 2 is positioned at one side of the circuit board 3 in the transversal direction X. In order not to interfere with other electrical connection components on the negative electrode terminal 13 and to achieve the accurate sampling, the circuit board 3 is connected to the thermistor 2 by the conductive wire 4 (i.e., one end of the conductive wire 4 is connected to the circuit board 3, and the other end of the conductive wire 4 is connected to the thermistor 2).

It should be added that, the "boundary" mentioned above refers to the maximum envelope position of the outer contour of the corresponding component in the transversal direction X (i.e., it may be a boundary line itself, or it may be an extension line perpendicular to the transversal direction X and made by the maximum envelope position).

Figure 7:
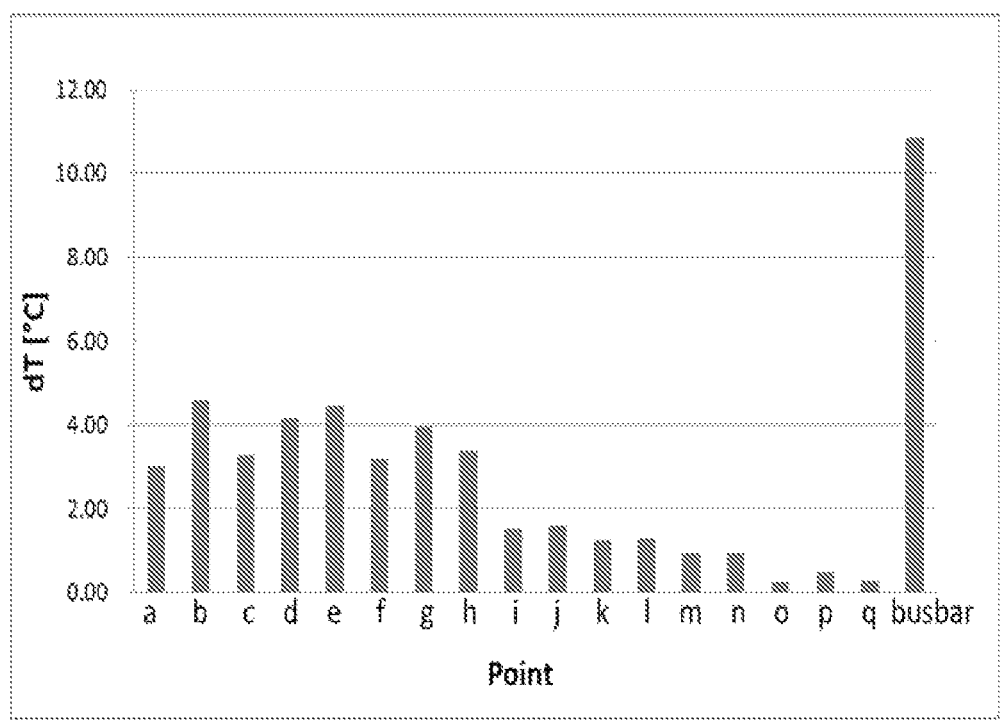
FIG. 7 a simulation experiment result of different sampling points, in which for the sake of clarity, the result of collected temperature on the connecting sheet in the background is given.

In order to further illustrate the accuracy of collecting the temperature of the battery 1 of the battery module of the present disclosure, the battery module of the present disclosure selects different positions on the cap plate 11 of the battery 1 as sampling points (the sampling points are sequentially numbered a~q) and performs a simulation experiment (including the case where the position on the connecting sheet is as the sampling point), and the results of the simulation experiment are shown in FIG. 7, the horizontal axis is the sampling points number, and the vertical axis is the deviation between the collected temperature and the actual temperature of the battery 1.

As can be seen from FIG. 7, when the thermistor 2 is provided on the connecting sheet (i.e., the busbar), the deviation between the collected temperature obtained by the thermistor 2 and the actual temperature of the battery 1 is the largest and exceeds 10° C.; when the thermistor 2 is provided on any one of the sampling points a~h, the deviation between the collected temperature obtained by the thermistor 2 and the actual temperature of the battery 1 are 2° C. or more; when the thermistor 2 is provided on any one of the sampling points o~q, although the deviation between the collected temperature obtained by the thermistor 2 and the actual temperature of the battery 1 are less than 1° C., the battery module needs to be placed in the box in practical applications, and because the sampling points o~q are positioned at the edge of the battery 1 and are easily affected by the temperature of the box, the collected temperature at the sampling points o~q may deviate from the actual temperature of the battery 1, therefore the sampling points o~q are not suitable as temperature sampling points in some cases; when the thermistor 2 is provided on any one of the sampling points i~n, the deviation between the collected temperature obtained by the thermistor 2 and the actual temperature of the battery 1 are equal or less than 2° C. and are less affected by the external environment (can be ignored). Therefore, preferably the thermistor 2 is positioned between the fifth boundary 131 of the negative electrode terminal 13 and the third boundary 141 of the vent 14.

Finally, a manufacturing method of the battery module will be described. Specifically, the manufacturing method of the battery module comprises steps of: providing the plurality of batteries 1, and each of the batteries 1 comprising a cap plate 11, a positive electrode terminal 12, a negative electrode terminal 13 and a vent 14, the positive electrode terminal 12 and the negative electrode terminal 13 being spaced apart from each other and provided on the cap plate 11, and the vent 14 being provided on the cap plate 11 and positioned between the positive electrode terminal 12 and the negative electrode terminal 13, and the cap plate 11 comprising a first boundary 111 away from the positive electrode terminal 12 in a transversal direction X, and the vent 14 comprising a third boundary 141 close to the positive electrode terminal 12 in the transversal direction X; making the plurality of batteries 1 arranged side by side in a longitudinal direction Y; providing a thermistor 2 and making the thermistor 2 positioned between the first boundary 111 of the cap plate 11 and the third boundary 141 of the vent 14; and making the thermistor 2 fixed on the cap plate 11.

What is claimed is:

1. A battery module, comprising a plurality of batteries arranged side by side in a longitudinal direction and a thermistor used for collecting the temperature of each of the batteries;
    each of the batteries comprising a cap plate, a positive electrode terminal, a negative electrode terminal and a vent, the positive electrode terminal and the negative electrode terminal being spaced apart from each other and provided on the cap plate, and the vent being provided on the cap plate and positioned between the positive electrode terminal and the negative electrode terminal;
    the cap plate comprising a first boundary away from the positive electrode terminal in a transversal direction, and the vent comprising a third boundary close to the positive electrode terminal in the transversal direction;
    the thermistor being provided on the cap plate and positioned between the first boundary of the cap plate and the third boundary of the vent.

2. The battery module according to claim 1, wherein
    the negative electrode terminal comprises a fifth boundary away from the vent in the transversal direction;
    the thermistor is positioned between the fifth boundary of the negative electrode terminal and the third boundary of the vent.

3. The battery module according to claim 2, wherein
    the negative electrode terminal further comprises a sixth boundary close to the vent in the transversal direction;
    the thermistor is positioned between the sixth boundary of the negative electrode terminal and the third boundary of the vent.

4. The battery module according to claim 3, wherein the thermistor is positioned between the fifth boundary and the sixth boundary of the negative electrode terminal.

5. The battery module according to claim 1, wherein
    the vent further comprises a fourth boundary away from the positive electrode terminal;
    the thermistor is positioned between the fourth boundary and the third boundary of the vent.

6. The battery module according to claim 1, wherein
    the battery module further comprises a circuit board provided above the cap plates of the plurality of batteries and positioned between the positive electrode terminal and the negative electrode terminal;
    the thermistor is connected to the circuit board.

7. The battery module according to claim 6, wherein the battery module further comprises a conductive wire, one end of the conductive wire is connected to the circuit board, and the other end of the conductive wire is connected to the thermistor.

8. The battery module according to claim 1, wherein each of the batteries further comprises:
    an electrode assembly comprising a main body portion, a positive electrode tab protruding from the main body portion and a negative electrode tab protruding from the main body portion;
    a case sealing the electrode assembly with the cap plate;
    a first adapter sheet connecting the positive electrode tab of the electrode assembly and the positive electrode terminal; and
    the second adapter sheet connecting the negative electrode tab of the electrode assembly and the negative electrode terminal.

9. The battery module according to claim 8, wherein the first adapter sheet is formed with a weak area.

10. The battery module according to claim 1, wherein a thermal pad or a thermal adhesive is provided between the cap plate and the thermistor.

11. A manufacturing method of a battery module, comprising steps of:
    providing a plurality of batteries, and each of the batteries comprising a cap plate, a positive electrode terminal, a negative electrode terminal and a vent, the positive electrode terminal and the negative electrode terminal being spaced apart from each other and provided on the cap plate, and the vent being provided on the cap plate and positioned between the positive electrode terminal and the negative electrode terminal, and the cap plate comprising a first boundary away from the positive electrode terminal in a transversal direction, and the vent comprising a third boundary close to the positive electrode terminal in the transversal direction;
    making the plurality of batteries arranged side by side in a longitudinal direction;

providing a thermistor and making the thermistor positioned between the first boundary of the cap plate and the third boundary of the vent; and making the thermistor fixed on the cap plate.

12. A vehicle, comprising a battery pack, and the battery pack comprising a battery module, wherein
the battery module comprises a plurality of batteries arranged side by side in a longitudinal direction and a thermistor used for collecting the temperature of each of the batteries;
each of the batteries comprises a cap plate, a positive electrode terminal, a negative electrode terminal and a vent, the positive electrode terminal and the negative electrode terminal are spaced apart from each other and provided on the cap plate, and the vent is provided on the cap plate and positioned between the positive electrode terminal and the negative electrode terminal;
the cap plate comprises a first boundary away from the positive electrode terminal in a transversal direction, and the vent comprises a third boundary close to the positive electrode terminal in the transversal direction;
the thermistor is provided on the cap plate and positioned between the first boundary of the cap plate and the third boundary of the vent.

13. The vehicle according to claim 12, wherein
the negative electrode terminal comprises a fifth boundary away from the vent in the transversal direction;
the thermistor is positioned between the fifth boundary of the negative electrode terminal and the third boundary of the vent.

14. The vehicle according to claim 13, wherein
the negative electrode terminal further comprises a sixth boundary close to the vent in the transversal direction;
the thermistor is positioned between the sixth boundary of the negative electrode terminal and the third boundary of the vent.

15. The vehicle according to claim 14, wherein the thermistor is positioned between the fifth boundary and the sixth boundary of the negative electrode terminal.

16. The vehicle according to claim 12, wherein
the vent further comprises a fourth boundary away from the positive electrode terminal;
the thermistor is positioned between the fourth boundary and the third boundary of the vent.

17. The vehicle according to claim 12, wherein
the battery module further comprises a circuit board provided above the cap plates of the plurality of batteries and positioned between the positive electrode terminal and the negative electrode terminal;
the thermistor is connected to the circuit board;
a conductive wire, one end of the conductive wire is connected to the circuit board, and the other end of the conductive wire is connected to the thermistor.

18. The vehicle according to claim 12, wherein each of the batteries further comprises:
an electrode assembly comprising a main body portion, a positive electrode tab protruding from the main body portion and a negative electrode tab protruding from the main body portion;
a case sealing the electrode assembly with the cap plate;
a first adapter sheet connecting the positive electrode tab of the electrode assembly and the positive electrode terminal; and
the second adapter sheet connecting the negative electrode tab of the electrode assembly and the negative electrode terminal.

19. The vehicle according to claim 18, wherein the first adapter sheet is formed with a weak area.

20. The vehicle according to claim 12, wherein a thermal pad or a thermal adhesive is provided between the cap plate and the thermistor.

* * * * *